United States Patent
Breuer et al.

(10) Patent No.: US 10,014,017 B1
(45) Date of Patent: Jul. 3, 2018

(54) TAPE DRIVE WITH INDEPENDENT TRANSVERSE MOTION OF TRANSDUCER AND TRANSDUCER HOUSING

(71) Applicant: International Business Machines Corporation, Armonk, NY (US)

(72) Inventors: Marcus Breuer, Dalheim (DE); Bernd Freitag, Partenheim (DE); Frank Krick, Ockenheim (DE); Tim Oswald, Gimbsheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/856,288

(22) Filed: Dec. 28, 2017

(51) Int. Cl.
G11B 5/52 (2006.01)
G11B 5/008 (2006.01)
G11B 5/40 (2006.01)
G11B 5/55 (2006.01)

(52) U.S. Cl.
CPC ............ *G11B 5/52* (2013.01); *G11B 5/00813* (2013.01); *G11B 5/40* (2013.01); *G11B 5/5504* (2013.01)

(58) Field of Classification Search
CPC ............ G11B 5/00813–5/00826; G11B 5/187–5/1871; G11B 5/3103–5/3106; G11B 5/40; G11B 5/48; G11B 5/4893; G11B 5/52; G11B 5/54–5/5517; G11B 5/584
USPC ............ 360/55, 69, 75, 77.12, 78.02, 78.05, 360/78.12
See application file for complete search history.

(56) References Cited

U.S. PATENT DOCUMENTS

| | | | |
|---|---|---|---|
| 6,856,488 B2 | 2/2005 | King | |
| 6,963,467 B2 * | 11/2005 | Bui | G11B 5/584 360/77.12 |
| 7,342,748 B2 * | 3/2008 | Yip | G11B 5/584 360/241.1 |
| 8,059,355 B2 * | 11/2011 | Nayak | G11B 5/584 360/75 |

(Continued)

FOREIGN PATENT DOCUMENTS

| | | |
|---|---|---|
| JP | 201187090 A | 9/2011 |
| JP | 2014013631 | 1/2014 |

OTHER PUBLICATIONS

Breuer et al., "Distributing Tape Drive Abrasion", U.S. Appl. No. 15/856,248, filed Dec. 28, 2017.

(Continued)

*Primary Examiner* — Wayne Young
*Assistant Examiner* — James L Habermehl
(74) *Attorney, Agent, or Firm* — David B. Woycechowsky (57) ABSTRACT

A tape drive system with a transducer (for example, a magnetic head arrays/separation shield) located in a recess of a transducer housing (for example, supporting rails, a U-shaped carbon tape guide). During seek operations and/or data access operations (that is, read/write operations), the transducer and the transducer housing are moved, in the transverse direction relative to the direction of elongation of the tape, independently of each other. The motion of the transducer housing (for example, back and forth oscillatory movement in the transverse direction) is controlled to even out wear across the tape-facing surface of the transducer housing. Some embodiments accomplish this by using separate motors to transversely move the transducer and the transducer housing.

20 Claims, 10 Drawing Sheets

(56) References Cited

U.S. PATENT DOCUMENTS

| | | | |
|---|---|---|---|
| 8,184,394 B2* | 5/2012 | Poorman | G11B 5/584 360/75 |
| 9,013,827 B1* | 4/2015 | Bui | G11B 5/584 360/77.12 |
| 9,153,259 B2 | 10/2015 | Dee | |
| 9,251,828 B2* | 2/2016 | Cherubini | G11B 5/584 |
| 9,299,365 B2* | 3/2016 | Biskeborn | G11B 5/52 |
| 9,892,751 B1* | 2/2018 | Harper | G11B 5/4893 |
| 2012/0106003 A1 | 5/2012 | Biskeborn et al. | |
| 2014/0204483 A1 | 7/2014 | Cherubini | |
| 2016/0203836 A1 | 7/2016 | Biskeborn et al. | |

OTHER PUBLICATIONS

Arnold et al., "Trends in micropositioning", Pezo and Hybrid Drives, elektro technik, Nov. 13, 2007, 13 pages.

French, John, "Tape Heads—An Introduction", reprinted from MIX Magazine, vol. 10, No. 8, downloaded on May 31, 2017, 5 pages.

Klein, Olaf, "Powerful miniature drives for medical technology in corpore sano", KEM, Jun. 3, 2004, 9 pages.

Yeo et al. "A Facile Approach of Fabricating Ultra-Thin Wear Resistant Si/SiNx/C Overcoats for Magnetic Tape Recording Heads", ASME 2014 Conference on Information Storage and Processing Systems, Santa Clara, California, USA, Jun. 23-24, 2014, Conference Sponsors: Information Storage and Processing Systems Division, ISBN: 978-0-7918-4579-0, Copyright © 2014 by ASME, 3 pages.

* cited by examiner

TAPE DRIVE WITH INDEPENDENT TRANSVERSE MOTION OF TRANSDUCER AND TRANSDUCER HOUSING

BACKGROUND

The present invention relates generally to the field of tape drives, and more particularly to tape drives for reading and writing computer data (such as digital data), and even more particularly to head wear of magnetic recording heads of such tape drives.

Figure 1:
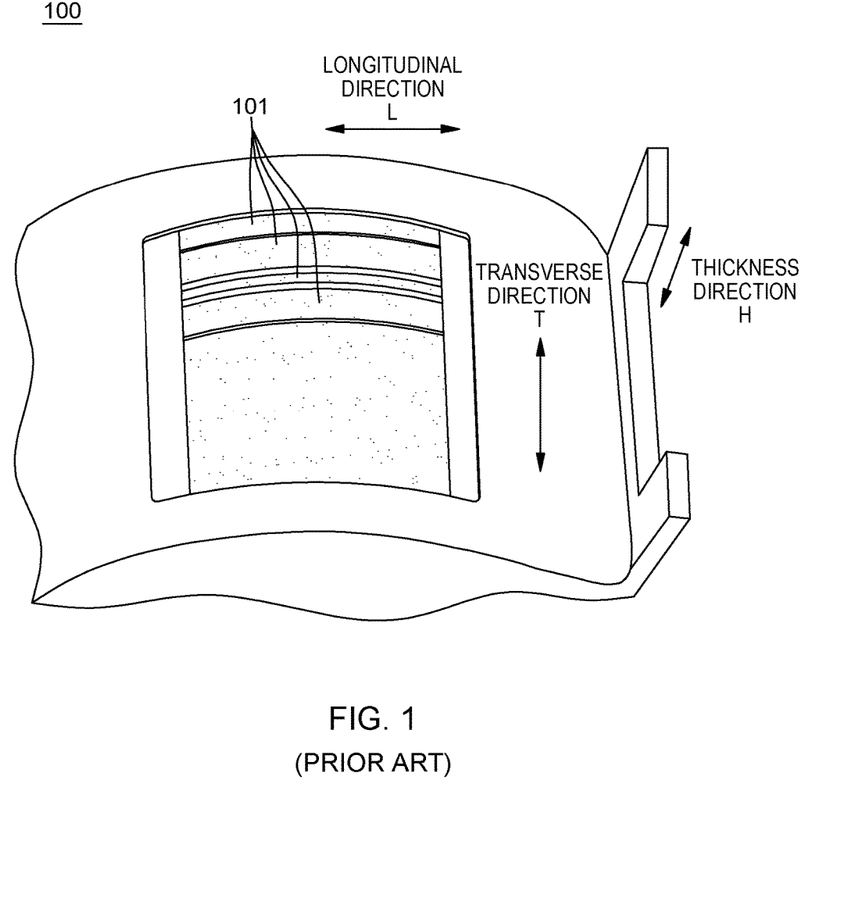
FIG. 1 is a perspective view of a prior art head.

Tape drives are used for storing digital data that is readable and/or executable by computers. Data is accessed (that is, read or written) on a tape medium, which is elongated and defines: (i) a longitudinal direction—that is, along the length of the tape medium; (ii) a thickness direction—that is the thickness of the flat tape medium; and (iii) a transverse direction—that is, direction across the width of the tape medium. When performing data access operations, the tape medium is actuated to move in the longitudinal direction with respect to a magnetic head (herein sometimes simply referred to as a "head") of the tape drive. Also, when seeking for a data storage location on the tape medium, typically in preparation for an access operation, the tape is also actuated to move in a longitudinal direction past the head. The relative longitudinal direction motion between the tape medium and the head causes wear on the head, which is a recognized problem. For example, FIG. 1 shows a conventional head 100 with worn grooves 101 caused by the transverse edges of tape mediums rubbing against the major surface of head 100 as the tape medium moves relative to the head in the longitudinal direction.

Servomechanisms in tape drives include several components, such as: (i) mechanical parts, (ii) transducers, and (iii) signal-processing units implemented by logical circuits. For example, in a track-follow servomechanism for some currently conventional tape drives, a coarse actuator and a fine actuator are used for the transverse (sometimes herein referred to as lateral) positioning of a rigid tape head module relative to the tape medium. The rigid tape head module typically includes: (i) data write and read elements, and (ii) servo read elements—also known as servo elements. Another component, called a skew actuator, tilts the tape head module to be angularly aligned during access (sometimes herein referred to as write/read or read/write) operations. One or multiple servo elements that are part of the tape head module provide servo signals to respective servo channels for computing estimates of tape velocity and longitudinal tape position as well as a lateral tape head position, also known as transverse position, with respect to the tape, and a controller determines digital control signals for actuators such as an actuator for moving the tape head module as a whole in the transverse (sometimes herein also referred to as the lateral) dimension.

Currently conventional tape drive systems have transducer assemblies that include: (i) a "transducer," that is, a piece part that includes one or more magnetic transducer(s) (for example magnetic head array(s)); and (ii) a "transducer housing," that is, a piece part with a recess that holds the transducer piece part (for example, a U-shaped carbon tape support member, supporting rails).

SUMMARY

According to an aspect of the present invention, a tape drive system assembly includes: (i) a transducer configured to read from and write to an elongated tape medium that defines a longitudinal direction and a transverse direction; (ii) a transducer housing shaped to define a recess; (iii) a motor(s) sub-assembly including at least one motor; (iv) a first transmission hardware set; (v) a second transmission hardware set; and (vi) a control module. The transducer is located in the recess in the transducer housing. The recess and the transducer are sized and shaped so that the transducer can slide in the transverse direction relative to the transducer housing. The motor(s) sub-assembly is configured to drive the transducer into transverse motion through the first transmission hardware set. The motor(s) sub-assembly is configured to drive the transducer housing into transverse motion through the second transmission hardware set. The control module is structured, connected and/or programmed to control the motor(s) sub-assembly, the first transmission hardware set and/or the second transmission hardware set so that, during a data access operation: (i) a transverse position of the transducer is controlled to be aligned with a predetermined data track on the tape medium, and (ii) a transverse position of the transducer housing is controlled to even out wear across a transverse length of the transducer housing.

According to a further aspect of the present invention, a tape drive system assembly includes: (i) a transducer configured to read from and write to an elongated tape medium that defines a longitudinal direction and a transverse direction; (ii) a transducer housing shaped to define a recess; (iii) a motor(s) sub-assembly including at least one motor; (iv) a first transmission hardware set; (v) a second transmission hardware set; and (vi) a control module. The transducer is located in the recess in the transducer housing. The recess and the transducer are sized and shaped so that the transducer can slide in the transverse direction relative to the transducer housing. The motor(s) sub-assembly is configured to drive the transducer into transverse motion through the first transmission hardware set. The motor(s) sub-assembly is configured to drive the transducer housing into transverse motion through the second transmission hardware set. The control module is structured, connected and/or programmed to control the motor(s) sub-assembly, the first transmission hardware set and/or the second transmission hardware set so that, during a seek operation: (i) a transverse position of the transducer is controlled to be aligned for transducer tracking during seek, and (ii) a transverse position of the transducer housing is controlled to even out wear across a transverse length of the transducer housing.

According to a further aspect of the present invention, a tape drive system assembly includes: (i) a transducer configured to read from and write to an elongated tape medium that defines a longitudinal direction and a transverse direction; (ii) a transducer housing shaped to define a recess; (iii) a motor(s) sub-assembly including at least one motor; (iv) a first transmission hardware set; (v) a second transmission hardware set; and (vi) a control module. The transducer is located in the recess in the transducer housing. The recess and the transducer are sized and shaped so that the transducer can slide in the transverse direction relative to the transducer housing. The motor(s) sub-assembly is configured to drive the transducer into transverse motion through the first transmission hardware set. The motor(s) sub-assembly is configured to drive the transducer housing into transverse motion through the second transmission hardware set. The control module is structured, connected and/or programmed to control the motor(s) sub-assembly, the first transmission hardware set and/or the second transmission hardware set so that: (a) during a data access operation: (i) a transverse position of the transducer is controlled to be aligned with a predetermined data track on the tape medium, and (ii) a transverse position of the transducer housing is controlled to even out wear across a transverse length of the transducer housing, and (b) during a seek operation: (i) a transverse position of the transducer is controlled to be aligned for transducer tracking during seek, and (ii) a transverse position of the transducer housing is controlled to even out wear across a transverse length of the transducer housing.

DETAILED DESCRIPTION

Some embodiments of the present invention are directed to a tape drive system with a transducer (for example, a magnetic head arrays/separation shield) located in a recess of a transducer housing (for example, supporting rails, a U-shaped carbon tape guide). During seek operations and/or data access operations (that is, read/write operations), the transducer and the transducer housing are moved, in the transverse direction relative to the direction of elongation of the tape, independently of each other. The motion of the transducer housing (for example, back and forth oscillatory movement in the transverse direction) is controlled to even out wear across the tape-facing surface of the transducer housing. Some embodiments accomplish this by using separate motors to respectively transversely move the transducer and the transducer housing.

I. Introduction

Because the these two portions of the tape head (that is, the data access sub-assembly and the package member) move (at least somewhat) independently of each other in the transverse direction: (i) the transverse position of the data access member can be controlled to read a selected data track or to track a servo tracking track; while (ii) the transverse position of the package member can be controlled to counter wear on the package member (for example, grooves caused by the transverse edges of the tape).

Figure 2:
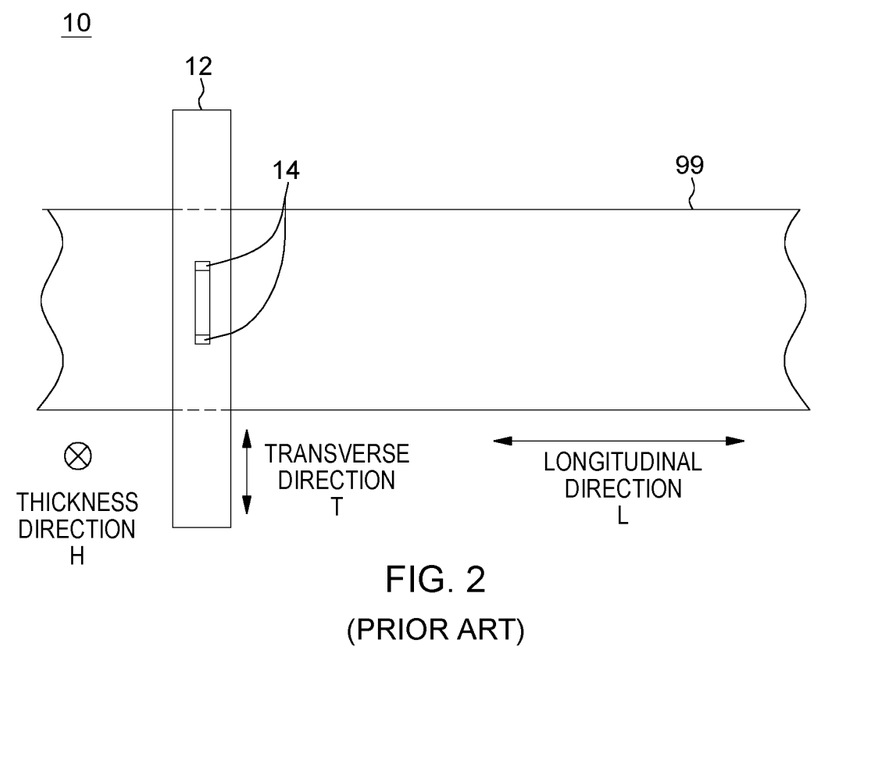
FIG. 2 is a top orthogonal view of a prior art tape drive system.

Some embodiments of the present invention may include one, or more, of the following features, characteristics, operations and/or advantages: (i) a method leading to more uniform distribution of head wear over the trans verse direction width of the head; (ii) a significant increase of the lifetime of the magnetic head; (iii) prevention of damage to tape mediums that would otherwise be occasioned by non-uniform head wear; (iv) can be applied to magnetic tape drives multiple write/read heads (for example, thirty-two (32) head tape drives) for writing and reading data from/to tape mediums; (v) stored data is arranged into tracks and data bands (0..3 by LTO (linear tape open)); (vi) stored data is read/written into both tape move (that is, longitudinal) directions—forward and backward; and/or (vi) can be applied to tape drives that "keep on track" (that is, achieve and maintain a correct transverse (sometimes called vertical) position relative to the tape medium) through the expedient of dedicated servo heads located, respectively, over and under the tape medium in the thickness direction which provide positional feedback based upon magnetic reference signals transduced from the tape medium by the servo heads (see FIG. 2 at: prior art tape drive system 10 including head mounting 12, servo heads 14 and tape medium 99).

In some embodiments of the present invention, by reading content from the tape medium, the tape drive has to seek to the related LPOS (longitudinal position) where the data resides. From a statistical point of view, for every read operation, the media has to be fast-forwarded by fifty (50) percent of the longitudinal length of the tape medium. These frequently repeated LPOS seek operations typically cause a lot of the head wear as mentioned, above, in the Background section. Some embodiments of the present invention significantly decrease this head wear problem.

Figure 3:
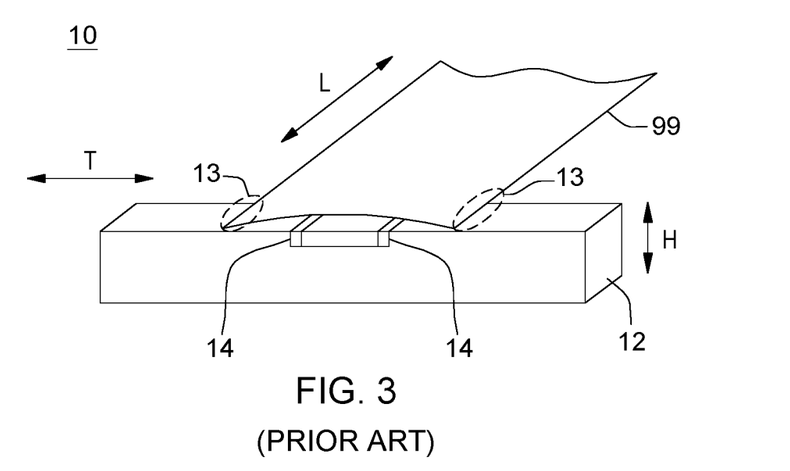
FIG. 3 is a perspective view of the prior art tape drive system of FIG. 2.

In some embodiments of the present invention, the tape itself is very thin in the thickness direction H, and the tape does not lie exactly flush over the head when it flies, in longitudinal direction L, with high speeds over the head and the head mounting. The tape edges slightly go down and form a kind of ellipse. FIG. 3 shows another view of prior art tape drive system 10 and the slightly curved cross-section of tape medium 99 in the H-T plane. This curvature causes rubbing at the transverse edges of the tape medium, which, in turn, can potentially cause grooves at head regions 13, which, in turn, would degenerate the head mounting and damage tape mediums. Some embodiments of the present invention significantly decrease this groove formation problem relative to what would be observed if similar tape drive operations were performed using prior art tape drive system 10.

Some embodiments of the present invention may recognize one, or more, of the following problems, opportunities for improvement, characteristics and/or drawbacks with respect to the current state of the art: (i) continuously increasing sensitivity and higher media speeds tend to exacerbate head wear problems; (ii) unequal distribution of the abrasion/grooves over the magnetic head; (iii) head gets destroyed early; (iv) magnetic tapes are damaged by the grooves caused by the mentioned abrasion; and/or (v) no feedback, monitoring or correction method implemented to protect the head.

Figure 4:
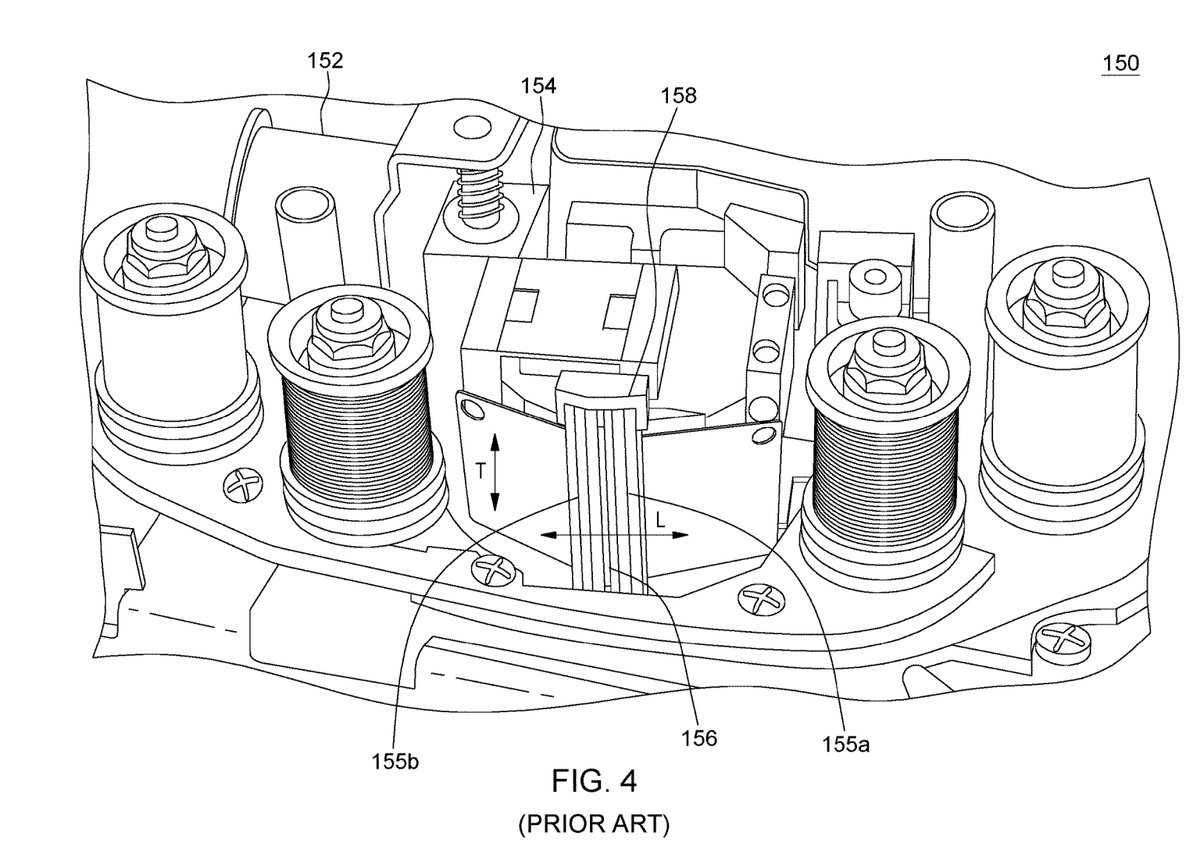
FIG. 4 is a perspective view of another prior art tape drive system.
Figure 5:
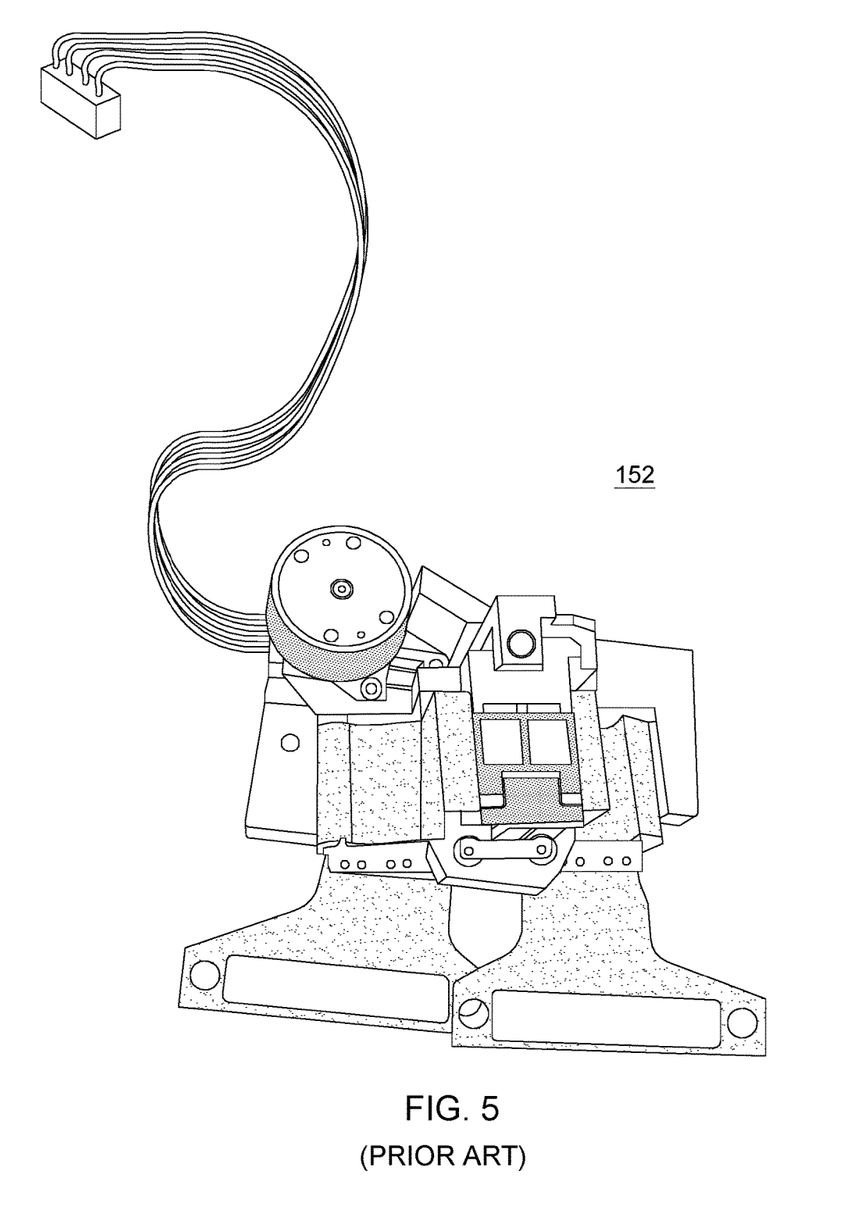
FIG. 5 is a perspective view of a portion of the prior art tape drive system of FIG. 4.

In order to better understand various embodiments of the present invention, it can be helpful to understand some basic hardware components of currently conventional magnetic head assemblies, such as prior art tape drive system 150 shown in FIGS. 4 and 5. Prior art tape drive system 150 includes: motor 152; spindle sub-assembly 154; first head array 155a; second head array 155b; separation shield 156;

and support rail 158. Motor 152 provides motive torque/force, through spindle sub-assembly 154 to move the head (including first head array 155a; second head array 155b; separation shield 156; and support rail 158) in the transverse direction T (sometimes herein referred to as the vertical direction). Prior art tape drive systems, like prior art tape drive system 150, typically operate in conjunction with a controller computer that includes a microprocessor and storage. The storage is typically used to store firmware associated with the tape drive. The firmware typically provides functionality for handling interactions with attached external host-computers via SCSI (Small Computer System Interface) commands to operate data IO (input-output) between the magnetic tape drive and the host computer.

Some embodiments of the present invention reduce wear on a magnetic tape drive head by re-purposing some hardware software and/or components existing in conventional tape drives, which re-purposed software and/or hardware components are those used to position the magnetic tape loaded into the magnetic tape drive to a dedicated position for reading or writing data from the dedicated position. In currently conventional tape drives, once the host computer has sent the SCSI command "Locate (92-hex)" to the magnetic tape drive, the magnetic tape drive firmware will start the motors to spool the tape onto the logical location initiated by the host computer. Additionally, it will move the magnetic tape heads onto the said track on the tape to control the current position. Once the signals communicated through the tape head indicates the desired longitudinal position on the tape is reached (in this case, the position 92-hex), the motors are stopped and the locate command finishes by returning a "command completed" status to the host computer. In prior art tape drive systems, wear takes place during the described seek process as well as the process to read the data requested by the host. This is because: (i) the tape makes contact with the supporting rails, the head arrays and the separation shield; (ii) the high speed of the moving magnetic tape; and (iii) the cross-sectional profile of the portion of the tape medium riding over the head at any given point in time during the seek operation (see FIG. 3).

Some embodiments of the present invention may include one, or more, of the following features, characteristics, operations and/or advantages: (i) methods leading to an equal distribution of the abrasion and therefore a significant increase of the lifetime of the magnetic head; (ii) avoiding damages to the tapes as grooves are avoided; (iii) grooves are avoided and therefore read/write quality is extended; (iv) exchangeability of tape media to different drives is improved; (v) tape media damages by grooves are avoided and therefore life time of the media is extended; (vi) maintenance due to data loss or drive or media replacement is reduced; and/or (vii) significantly extended life time of the tape drive.

Some embodiments of the present invention may include one, or more, of the following features, characteristics, advantages and/or operations: (i) tape drive design with mechanically separation of the head arrays/separation shield package from the supporting rails; (ii) tape drive design with operative connection to the head arrays/separation shield package (sometimes herein referred to simply as a "package") to a new second motor (that is, a motor additional to a motor like motor 152, mentioned above); and/or (iii) generation and control (oscillating movement of the above mentioned package) by types of firmware to be discussed in detail, below.

In some embodiments of the present invention: (i) a first motor moves the supporting rails; (ii) a second motor is used to actuate the head array to maintain appropriate transverse direction T alignment with appropriate tracks defined by the stored data on the tape medium; and (iii) the two types of motion described in the preceding two items on this list may occur at the same time. In some embodiments of the present invention, servo track information is read and processed to control the second motor to adjust the transverse direction T position of the head during data access operations.

Some embodiments of the present invention may include one, or more, of the following features, characteristics, advantages and/or operations: (i) a separation of the head arrays/separation shield package; (ii) a second motor to keep the package on track; (iii) an operative connection of the package to the motor so that controlled rotation of the motor drives the package into appropriate linear translational motion in the transverse direction T; (iv) machine logic (for example, control firmware) which controls the motion of the first motor; (v) with the implemented mechanical separation and independent head array motion: (a) the magnetic read/write head elements can remain positioned in transverse direction T in proximity to a predetermined band/track of data on the tape medium for data access operations, while (b) the head supporting rail mechanism (including piece parts that experience the wearing of groves by contact with transverse edges of tape mediums can oscillate, in the transverse direction T, independently of the read/write head elements; and/or (vi) this enables the oscillation mechanism, which promotes even wear of the head supporting rail mechanism, to be performed during data access operations and not merely during seek operations.

In embodiments of the present invention where magnetic read/write head elements (sometimes herein referred to as the "magnetic transduction device portion of the head," or, more simply, the "transducer device") moves independently in transverse direction T relative to head supporting rail mechanism (sometimes herein referred to as the "transducer housing"), uneven wear (for example, worn grooves) can be made more uniform by simultaneously: (i) positioning the transducer device in transverse direction T to be aligned with data to be accessed (that is, read from or written to) on the date medium; and (ii) positioning and/or moving (for example, oscillatory movement) the transducer housing in a manner so as to promote uniformity of wear caused by the tape medium (for example, transverse edges of the tape medium) on the transducer housing. The edges of the tape itself smooth down the head array and the head supporting rails. In some embodiments, by actuating an oscillating movement of the transducer housing in transverse direction T, the entire width of the head mounting can be utilized so that the wear gets spread about the maximum area. In some embodiments, two motors are used to provide the independent transverse direction movements of the transducer device and the transducer housing. In other embodiments, intermediate mechanical components, such as differential gears, may be used so that a single motor provides all of the motive force/torque for both independent types of movement.

II. Embodiment of FIGS. 6 and 7

Figure 6:
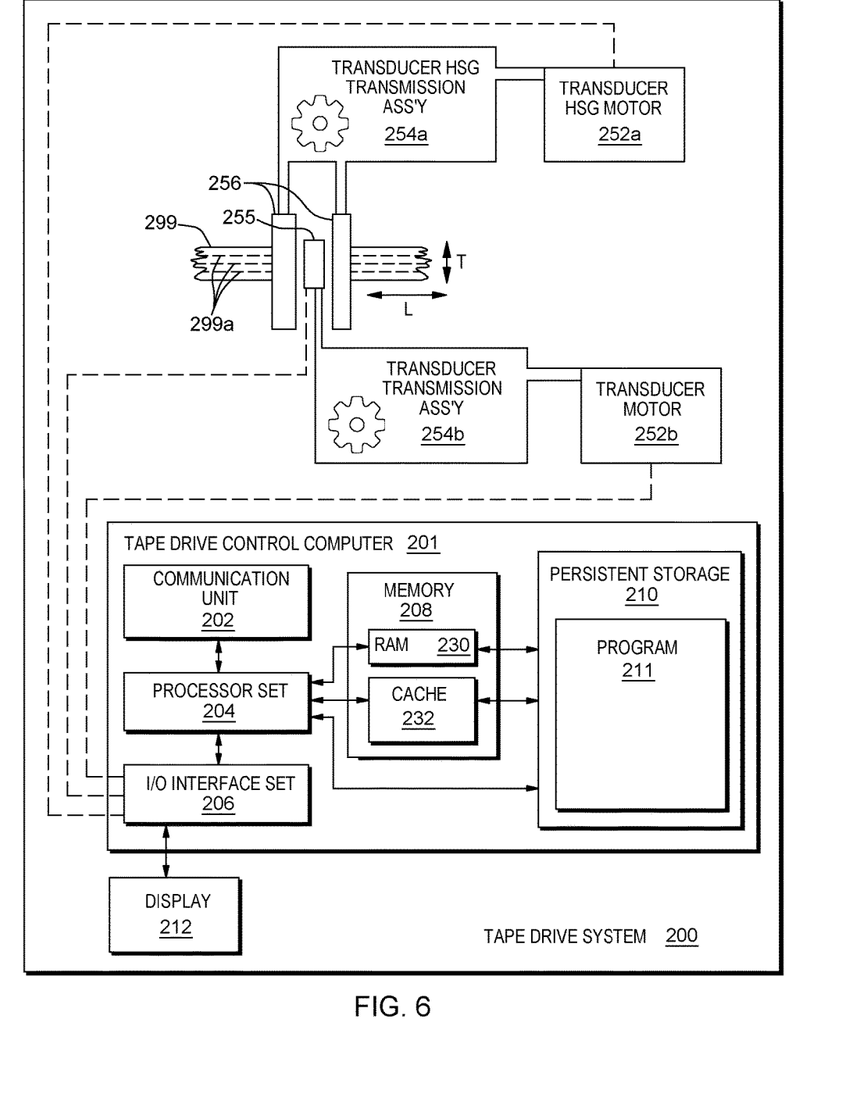
FIG. 6 is a block diagram of tape drive system according to an embodiment of the present invention.
Figure 7:
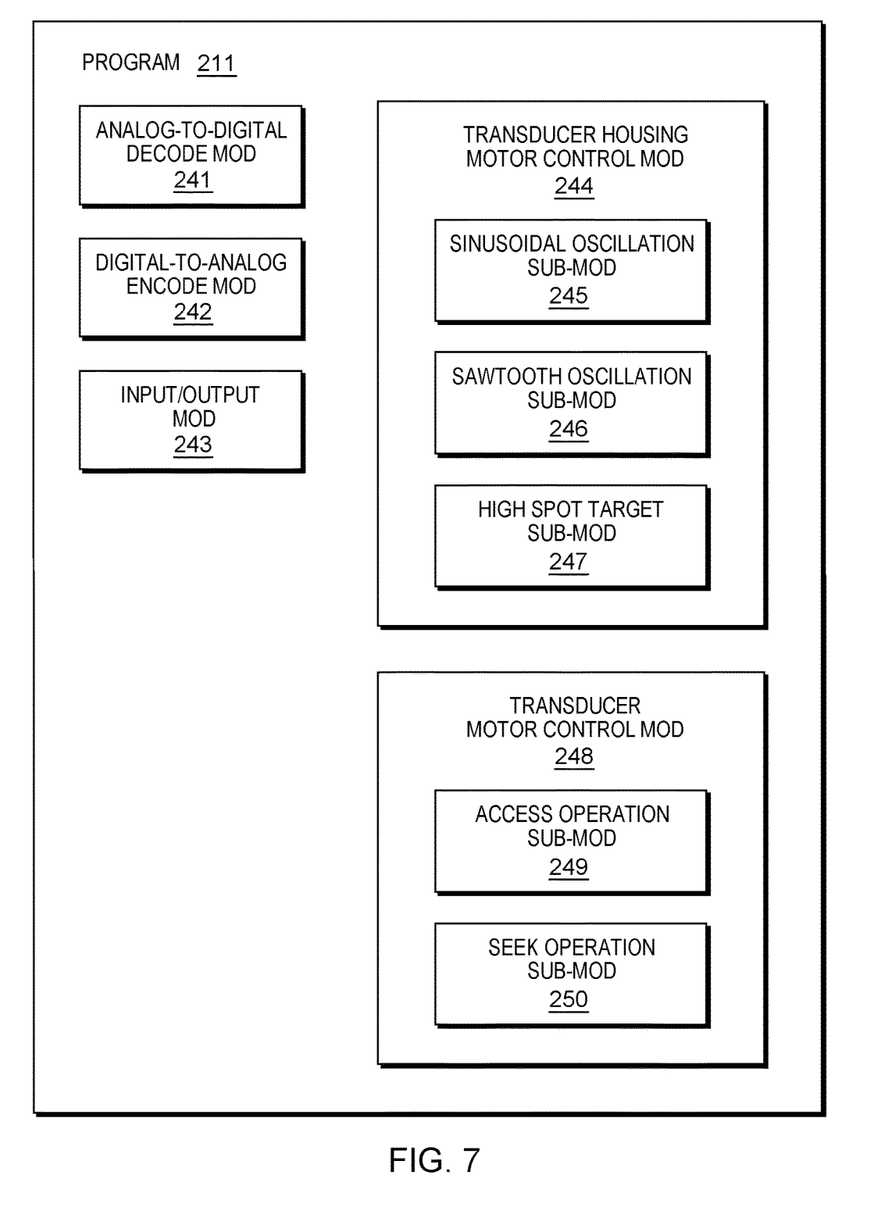
FIG. 7 is block diagram of a portion of the system of FIG. 6.

As shown in FIG. 6, tape dive system 200 includes: tape drive control computer 201; user interface devices 212 (these are devices such as a keyboard, mouse, printer and display screen); transducer housing motor 252a; transducer motor 252b; transducer housing transmission assembly 254*a*; transducer transmission assembly 254*b*; transducer 255; transducer housing 256; and tape medium 299 (including data and servo tracks 299*a*). Tape drive control computer 201 includes: communication unit 202 (for communicating over networks, like the internet); processor set 204 (for example, a single chip central processing unit); input/output interface set 206 (for communicating with peripheral devices); volatile memory 208 (including random access memory 230 and off-chip cache 232); and persistent storage 210 (including program 211). As shown in FIG. 7, program 211 (in this example, a firmware program) includes: analog-to-digital decode module ("mod") 241; digital-to-analog encode mod 242; input/output mod 243; transducer housing motor control mod 244 (including sinusoidal oscillation sub-mod, 245, sawtooth oscillation sub-mod 246 and high spot target sub-mod 247); and transducer motor control mod 248 (including access operation sub-mod 249 and seek operation sub-mod 250).

As in conventional tape drive systems, transducer 255: (i) during a write operation, transduces electrical signals, received from digital-to-analog encode mod 242 and through processor set 204, input/output interface set 206 and input/output mod 243, to magnetic fields suitable for writing data to tape medium 299; and (ii) during a read operation, transduces magnetic signals, received from tape medium 299, to electric signals that are sent to analog-to-digital decode mod 241 though input/output interface set 206, processor set 204 and input/output mod 243. In this embodiment, transducer 255 includes only a single head array. As will be further discussed, below, other embodiments may have transducers with multiple head arrays and/or separation shield(s).

Transducer motor control mod 248 controls the transverse position (that is, the position in direction T as shown in FIG. 6) of transducer 255 so that transducer 255 is: (i) aligned with a data track during a read or write operation (more specifically, this transverse positioning is controlled by sub-mod 249); and (ii) aligned with a servo track during a seek operation (more specifically, this transverse positioning is controlled by sub-mod 250).

As in currently conventional tape drive systems, transducer housing 256 guides tape medium 299 so that it remains in close proximity to transducer 255 as tape medium 299 moves past transducer 255 in longitudinal direction L. As discussed above, and as will further be discussed, below: (i) this guidance causes abrasive wear on transducer housing 256; and (ii) an important objective of some embodiments of the present invention is to make this abrasive wear more uniform across the transverse direction length of transducer housing 256. For this reason, transducer housing motor control mod 244 controls the transverse positioning of the transducer housing so that abrasive wear caused by tape medium 299 is evenly distributed across the transverse length of transducer housing 256.

More specifically, in the embodiment of system 200, transducer housing motor control mod 244 can alternatively control transverse positioning of the transducer housing in three modes as follows: (i) sinusoidal oscillation sub-mod 245 controls the transverse position of transducer housing 256 in a sinusoidal oscillating manner; (ii) sawtooth oscillation sub-mod 246 controls the transverse position of transducer housing 256 in a sawtooth oscillating manner; and (iii) high spot targeting sub-mod 245 controls the transverse position of transducer housing 256 so that transverse edges of tape 299 will caused abrasive wear on "high spots" (that is, relatively unworn spots) on the transducer housing 256. Alternatively, other embodiments may have more, or fewer, modes of transducer housing positioning control. Alternatively, other modes of transducer housing position control may be implemented to counter wear.

Based on the explanations of the previous two paragraphs, those of ordinary skill in the art will appreciate that tape drive system 200 controls the transverse position of transducer 255 independently of control of the transverse position of transducer housing 256. This is not believed to be a feature of currently conventional tape drives. Now that the machine logic implementation of this independent control of the transducer and transducer housing has been discussed, the following paragraphs will discuss how this independent transverse positioning is implemented in the hardware of tape drive system 200.

In tape drive system 200: (i) the operation of transducer housing motor 252*a* controls the transverse position of transducer housing 256; and (ii) the operation of transducer motor 252*b* controls the transverse position of transducer 255. While this embodiment uses two separate motors to control the respective transverse positioning and motion of the transducer and transducer housing, some embodiments may use a single motor to do this by selectively operatively engaging the single motor with either of the transducer or transducer housing. However, it is noted that single motor embodiments may involve substantial firmware and/or hardware design challenges.

As a threshold matter, it should be understood that in tape drive system 200, the transducer and transducer housing are structured so that: (i) transducer housing 256 is rigidly mechanically connected to transducer housing transmission assembly 254*a* and transducer housing motor 252*a*; (ii) (i) transducer 255 is rigidly mechanically connected to transducer transmission assembly 254*b* and transducer motor 252*b*; and (iii) as a result of the foregoing two design features: (a) transverse position of transducer 255 has no influence on transverse positioning of transducer housing 256, and (b) transverse position of transducer housing 256 has no influence on transverse positioning of transducer 255. This is not necessarily the preferred hardware implementation in all embodiments of the present invention. Other embodiments, discussed in detail, below, use the transducer motor to offset the effects of transducer housing motion actuated by the transducer housing motor. For many, if not most, embodiments of the present invention, this will be the preferred mechanical structure. However, system 200 is structured as explained, above, to help fully illustrate potential scope of the present invention.

As another threshold matter, in this embodiment: (i) transducer housing motor 252*a* and transducer housing motor 252*b* are rotary motors; and (ii) transducer housing transmission assembly 254*a* and transducer transmission assembly 254*b* are made up of gear trains to convert the rotary motion of the respective motors into respective, independent linear motions in the transverse direction T. Again, this is not necessarily the preferred hardware implementation in all embodiments of the present invention. Other embodiments, discussed in detail, below, use motors with threaded spindles. Still other embodiments may use linear motors, for example, linear cam stack actuators. However, system 200 uses a classic rotary motor and gear based motion transmission to help fully illustrate the potential scope of the present invention.

The control of the transverse position in of transducer 255 of tape drive system 200 operates as follows: (i) during a read write operation, access operation sub-mod 249 of transducer motor control mod 248 sends appropriate signals to transducer motor 252*b* to: (a) move to an indexed position corresponding to a transverse position of transducer 255 corresponding to a data track on tape medium 299 to be read from and/or written to, and (b) make adjustments to transverse position of transducer 255 to follow the data track as data is being read/written to tape medium 299; and (ii) during a seek operation, seek operation sub-mod 250 of transducer motor control mod 248 sends appropriate signals to transducer motor 252a to: (a) move to an indexed position corresponding to a transverse position of transducer 255 corresponding to a servo track on tape medium 299, and (b) make adjustments to transverse position of transducer 255 to follow the servo track during progress of the seek operation.

The control of the transverse position in of transducer housing 256 of tape drive system 200 operates as follows: (i) during a read write operation, an appropriate mode of abrasive wear countering positioning (in this example, sinusoidal, sawtooth, high-spot targeting) is chosen; and (ii) transducer housing motor control mod 244 sends appropriate signals to transducer housing motor 252a to position the transducer housing on an ongoing basis for the duration of the seek operation. In some embodiments, the pattern of moving the transducer housing may include variable parameters other than waveform, such as oscillation speed (or period) and/or oscillation amplitude.

III. Embodiment of FIGS. 8 to 12

Figure 8:
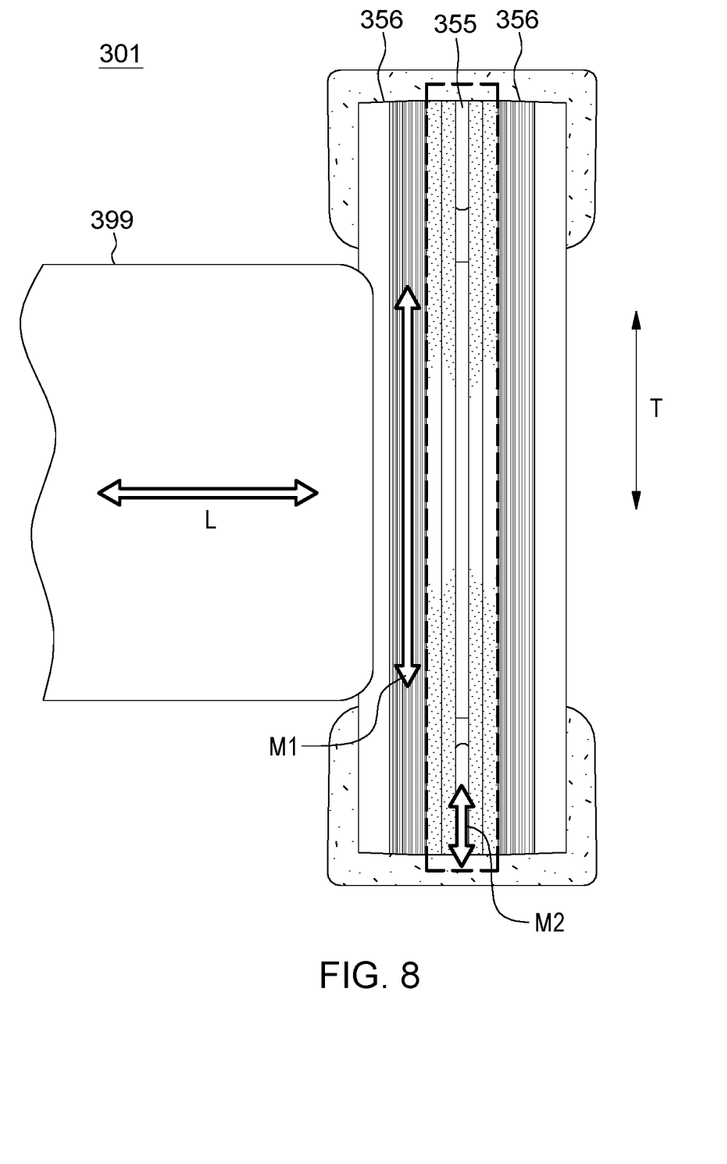
FIG. 8 is an orthogonal view of a portion of the embodiment of FIG. 11.
Figure 9:
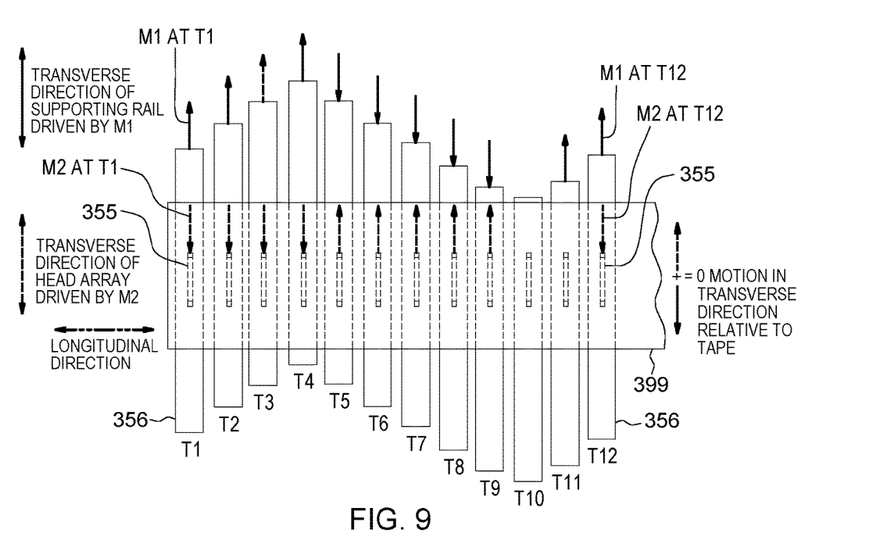
FIG. 9 is a time diagram of a portion of the embodiment of FIG. 11.
Figure 11:
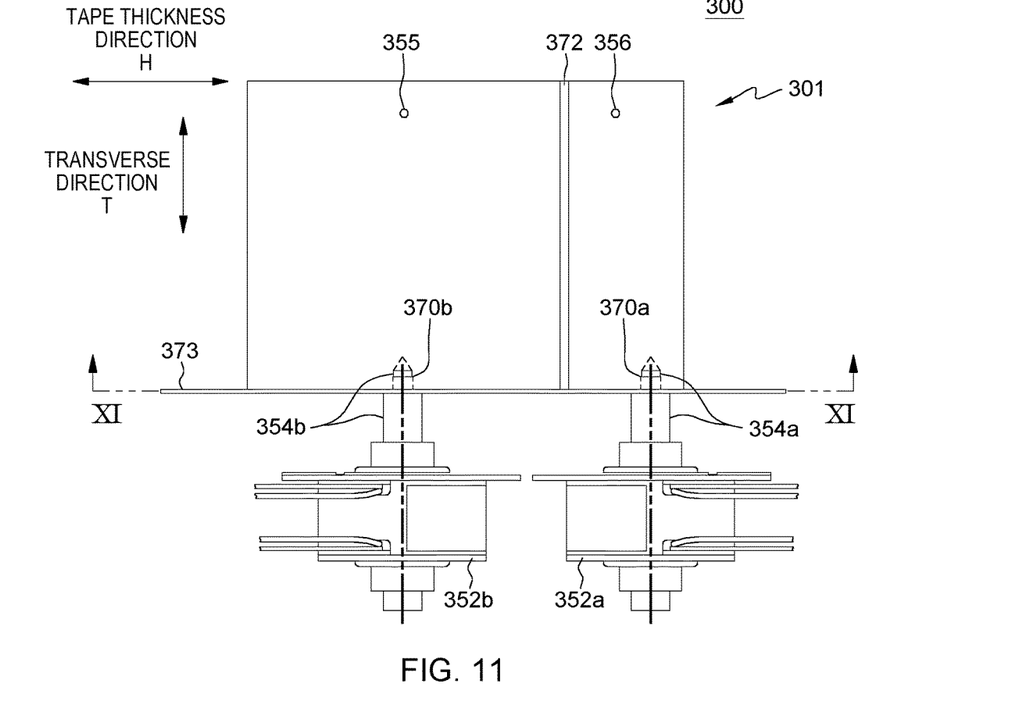
FIG. 11 is a top orthogonal view of a tape drive system according to another embodiment of the present invention.
Figure 12:
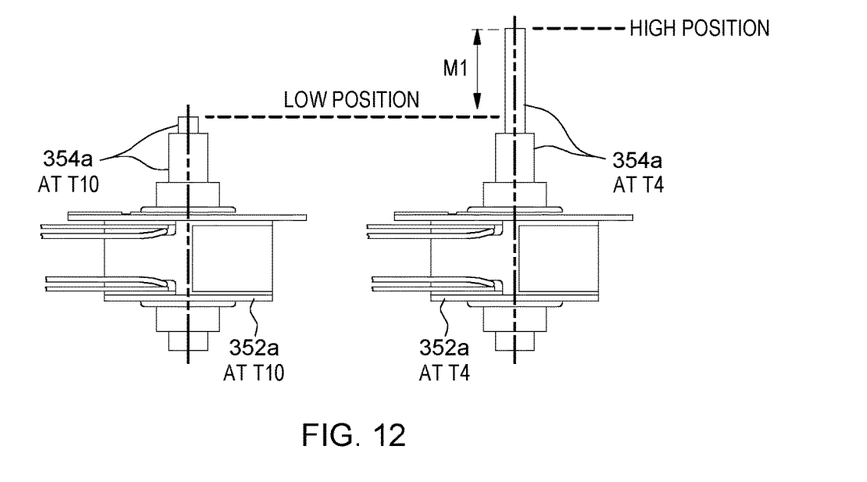
FIG. 12 is a diagram showing a portion of the embodiment of FIG. 11.
Figure 13:
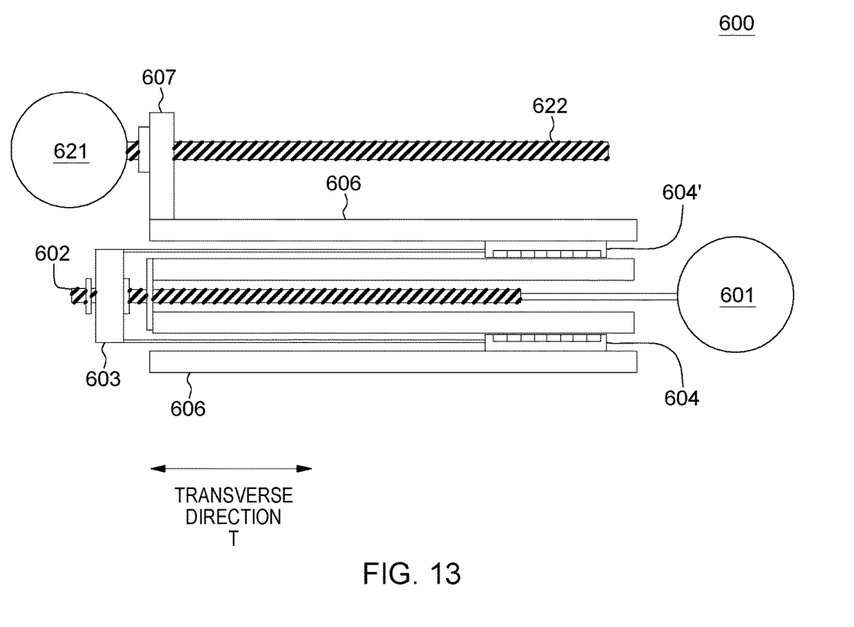
FIG. 13 is a top orthographic view of a tape drive system according to another embodiment of the present invention.

FIGS. 8 to 12 show various portions of transducer assembly 301, including: transducer housing motor 352a; transducer motor 352b; transducer housing transmission 354a; transducer transmission 354b; transducer 355; transducer housing 356; and tape medium 399. As shown in FIG. 9, the relative orientation between transducer 355 and tape medium 399 define longitudinal direction L and transverse direction T. As shown in FIGS. 9 and 13: (i) arrow M1 indicates transverse motion of transducer housing 356 (driven by transducer housing motor 352a through transducer housing transmission 354a); and (ii) arrow M2 indicates transverse motion of transducer 355 (driven by transducer motor 354b through transducer transmission 354b).

The embodiment of FIGS. 8 to 12 is similar to the embodiment of FIGS. 6 and 7, discussed above, in that the transducer and the transducer housing move, in the transverse direction, independently of each other so that: (i) the transducer is in the transverse position in which it needs to be to interact with the tape medium to perform servo tracking and data access operations; and (ii) the transverse dimension position of the transducer housing is adjusted (typically by relatively constant oscillatory movement while the tape is moving in the longitudinal direction) to cause relatively uniform wear over the transverse length of the transducer housing.

Figure 10:
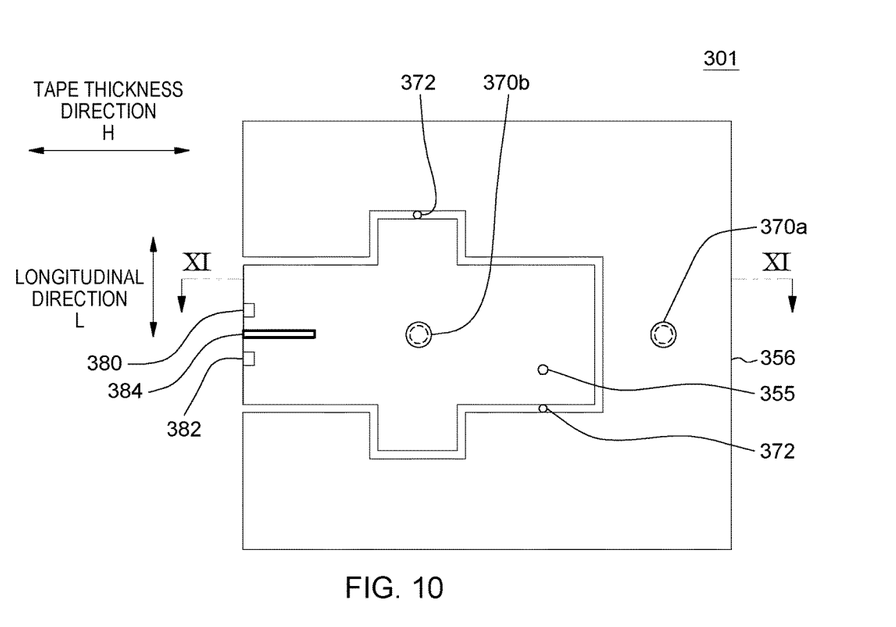
FIG. 10 is a front orthogonal view of a portion of the embodiment of FIG. 11.

The embodiment of FIGS. 8 to 12 is dissimilar to the embodiment of FIGS. 6 and 7, discussed above, in that transducer 355 and transducer housing 356 are structured so that transducer 355 will move, in the transverse direction, with transducer housing unless the transverse direction motion of the transducer housing is offset by opposite transverse direction motion actuated by transducer motor 352b (see FIG. 11). These counteracting motions, of transducer housing motor 352a (see FIG. 11) and transducer motor 352b, will be further discussed, below, in connection with FIG. 9. The embodiment of FIGS. 8 to 12 is further dissimilar to the embodiment of FIGS. 6 and 7, discussed above, in that it uses two motors, rather than a single motor. Many, if not most, preferred embodiments of the present invention will include at least two motors because this eliminates the need for complex transmission hardware.

FIG. 9 shows, for twelve (12) discrete times T1 to T12: (i) the transverse direction motion M2 of transducer 355 (sometimes also referred to a "head array") relative to tape medium 399; and (ii) the transverse direction motion M1 of transducer housing 356 (sometimes also referred to as "supporting rails") relative to tape medium 399. Motion M1 is driven by transducer housing motor 352a (see FIG. 12). Motion M2 is driven by transducer motor 352b (see FIG. 11). In this embodiment, the hardware of transducer motor 352b and transducer motor transmission 354b is similar to hardware used in prior art tape drive systems that do not have independent transverse direction motion of the transducer and transducer housing. However, the addition of transducer housing motor 352a and the machine logic (for example, firmware) to control these models is believed to be new. A shown in FIG. 9, the motions M1 (driven by transducer housing motor 352a) and M2 (driven by transducer motor 352b) are in opposite directions and of equal magnitude with the net result being that: (i) transducer housing 356 oscillates sinusoidally with respect to longitudinally-moving tape medium 399; (ii) transducer 355 holds a constant transverse position as tape medium 399 passes by it in the longitudinal direction. In this way, the head array stays on track and is able to perform read/write/seek operations.

As shown by the heavy dashed rectangle in FIG. 8, there is separation of transducer 355 (also called the "head array/separation shield package") and transducer housing 356 (also called the "supporting rails"). As shown in FIG. 11, the hardware of transducer housing motor 352a is identical to the hardware of transducer motor 352b. However, as discussed above, this embodiment controls the respective motions of these two motors in a coordinated manner. In this embodiment, state of the art head adjustment is performed by transducer motor 352b. Transducer housing motor 352a moves the supporting rails in the transverse direction.

FIG. 11 shows a cross-sectional view (cross hatching omitted for clarity of illustration) of transducer 355 and transducer housing 356. As shown in FIGS. 11 and 12: (i) transducer 355 includes blind hole 370b for mounting a shaft that is part of transducer transmission 354b; and (ii) transducer housing 356 includes blind hole 370a for mounting a shaft that is part of transducer housing transmission 354a. FIG. 10 also shows the following components of transducer 355: (i) first head array 380; (ii) second head array 382; and (iii) separation shield 384. FIG. 11 also shows transducer/housing slidable interface 372. More specifically, interface 372 is a recess formed in the transducer housing that is: (i) elongated in the transverse direction to allow the transducer to slide in the transverse direction relative to the transducer housing; and (ii) has a cruciform, or other appropriate, footprint in the H-L plane so that there is little to no relative motion between the transducer and the transducer housing in the thickness and/or longitudinal directions.

FIG. 11 shows tape drive system 300, including: transducer assembly 301; transducer housing motor 352a; transducer motor 352b; transducer housing transmission 354a; and transducer motor 354b; and mounting sheet 373. Transducer housing transmission 354a includes a shaft that is actuated by transducer housing motor 352a to move back and forth in transverse direction T in a controlled fashion under control of firmware (not separately shown). This is what causes transducer housing motion M1 (see FIG. 9). Transducer transmission 354b includes a shaft that is actuated by transducer motor 352b to move back and forth in transverse direction T in a controlled fashion under control of firmware (not separately shown). This is what causes transducer motion M2 (see FIG. 9). In this embodiment, transducer housing motor 352a and transducer motor 352b are each in the form of linear cam stack actuators.

IV. Emodiment of FIG. 13

FIG. 13 shows transducer motors assembly 600 for use in a tape drive system. Assembly 600 includes: transducer motor 601; threaded transducer telescope spindle 602; separated sliding support 603; magnetic read/write head array elements 604, 604'; U-shaped carbon tape support 606; threaded support bracket 607; transducer housing motor 621; and threaded transducer housing telescope spindle 622. Magnetic read/write head array elements 604, 604' form the transducer in this embodiment. U-shaped carbon tape support 606 forms the transducer housing in this embodiment.

As with the embodiments described above, a design objective of assembly 600 is to change unevenly distributed abrasive wear (for example, groove in a transducer housing) into more homogeneous abrasive wear. Like the car wheel ruts on the road, which are created because all cars have to drive on the same lane, the idea is to independently move in the transverse direction: (i) magnetic head-array elements 604, 604'; and (ii) U-shaped carbon tape support 606. As shown in FIG. 13, magnetic read/write head array elements 604, 604' can be moved in transverse direction T on their separated sliding support 603 using transducer motor 601. Transducer motor 601 actuates the transverse direction motion of separated sliding support 603 and magnetic read/write head array elements 604, 604' by turning threaded transducer motor telescope spindle 602 so that the threaded engagement between spindle 602 and support 603 causes the support to move in transverse direction T, thereby carrying magnetic read/write head array elements 604, 604' to the correct transverse positions required over time for data access and/or tracking operations.

Transducer housing motor 621 turns spindle 622 to move U-shaped carbon tape support 606 by action of the threaded engagement between threaded support bracket 607 and spindle 622. This design provides for independent transverse motion and positioning of: (i) U-shaped carbon tape support 606; and (ii) magnetic read/write head arrays 604, 604'. Magnetic read/write head arrays 604, 604' are mounted on separated sliding head support mechanism 603. For example, magnetic read/write head arrays 604, 604' can be positioned in transverse direction alignment with a first track on a tape medium (not shown) by turning transducer motor 601. This controlled transverse alignment between the head arrays and the tape medium allows processing of data to and from the first data track. From a data processing point of view no changes are needed. The changes proposed are on the mechanical side by implementing transducer housing motor 621 to transversely oscillate U-shaped carbon tape support while the head arrays 604, 604' maintain a constant transverse position. This helps avoid uneven abrasion of U-shaped carbon tape support 606. U-shaped carbon tape support 606 is driven to transversely oscillate by switching the direction of transducer housing 621, in the forward and backward transverse directions. This way the transverse edges of the tape itself smooth down the magnetoresistive (MR) head and the U-shaped carbon tape support equally and ruts are avoided.

With the mechanical separation and independent telescoping sliding, the magnetic read/write head element arrays can stay on the same band/track for processing data while the U-shaped carbon tape support mechanism independently can oscillate its position below the moving magnetic tape. With this method and apparatus, the abrasive wear can be controlled across the whole U-shaped carbon tape supporting rails that house the magnetic read/write heads.

V. Additional Comments and Definitions

Some embodiments of the present invention may include one, or more, of the following features, characteristics, operations and/or advantages: (i) every band on the tape medium is bordered by servo tracks; (ii) uses an Amplitude-Based-Pattern for servo tracks on the tape medium; (iii) transducer assembly has a protection layer to slow wear; (iv) transducer assembly has no protection layer; (v) lubrication used on transducer assembly to slow wear; (vi) no lubrication layer used on transducer assembly; (vii) movement of read/write head in vertical (that is, transverse) direction with respect to data track on the tape medium in order to achieve relatively homogenous abrasion; (viii) movement is controlled by an algorithm which ensures homogenous abrasion; and/or (ix) movement of read/write head in vertical direction to track direction of the tape medium during forwarding of the tape medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The following paragraphs set forth some definitions for certain words or terms for purposes of understanding and/or interpreting this document.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Electrically Connected: means either directly electrically connected, or indirectly electrically connected, such that intervening elements are present; an electrical connection may include, but need not be limited to, elements such as capacitors, inductors, transformers, vacuum tubes, and the like.

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A tape drive system assembly comprising:
   a transducer configured to read from and write to an elongated tape medium that defines a longitudinal direction and a transverse direction;
   a transducer housing shaped to define a recess;
   a motor(s) sub-assembly including at least one motor;
   a first transmission hardware set;
   a second transmission hardware set; and
   a control module;
   wherein:
   the transducer is located in the recess in the transducer housing;
   the recess and the transducer are sized and shaped so that the transducer can slide in the transverse direction relative to the transducer housing;
   the motor(s) sub-assembly is configured to drive the transducer into transverse motion through the first transmission hardware set;
   the motor(s) sub-assembly is configured to drive the transducer housing into transverse motion through the second transmission hardware set; and
   the control module is structured, connected and/or programmed to control the motor(s) sub-assembly, the first transmission hardware set and/or the second transmission hardware set so that, during a data access operation: (i) a transverse position of the transducer is controlled to be aligned with a predetermined data track on the tape medium, and (ii) a transverse position of the transducer housing is controlled to even out wear across a transverse length of the transducer housing.

2. The assembly of claim 1 wherein the transducer includes two magnetic read/write head arrays and a separation shield.

3. The assembly of claim 1 wherein the motor(s) sub-assembly includes:
   a first motor operatively connected to the first transmission hardware set to drive the transducer into transverse direction motion through the first transmission hardware set; and
   a second motor operatively connected to the second transmission hardware set to drive the transducer into transverse direction motion through the first transmission hardware set.

4. The assembly of claim 3 wherein:
   the first motor is a linear cam stack actuator;
   the first transmission hardware set is a first spindle driven in linear direction motion by the first motor;
   the transducer is rigidly mechanically connected to a distal end of the first spindle;
   the second motor is a linear cam stack actuator;
   the second transmission hardware set is a second spindle driven in linear direction motion by the second motor; and
   the transducer housing is rigidly mechanically connected to a distal end of the first spindle.

5. The assembly of claim 3 wherein:
   the first motor is a rotary motor;
   the first transmission hardware set is a first threaded spindle driven in rotational direction motion by the first motor;
   the transducer is threadably engaged with the first threaded spindle so that rotation of the first threaded spindle causes the transducer to move in the transverse direction;
   the second motor is a rotary motor;
   the second transmission hardware set is a second threaded spindle driven in rotational direction motion by the first motor; and
   the transducer is threadably engaged with the second threaded spindle so that rotation of the second threaded spindle causes the transducer housing to move in the transverse direction.

6. The assembly of claim 3 wherein the second transmission hardware set is further operatively connected to the transducer to drive the transducer into transverse direction motion absent offsetting transverse direction motion caused by the first motor through the first transmission hardware set.

7. A tape drive system assembly comprising:
   a transducer configured to read from and write to an elongated tape medium that defines a longitudinal direction and a transverse direction;
   a transducer housing shaped to define a recess;
   a motor(s) sub-assembly including at least one motor;
   a first transmission hardware set;
   a second transmission hardware set; and
   a control module;
   wherein:
   the transducer is located in the recess in the transducer housing;
   the recess and the transducer are sized and shaped so that the transducer can slide in the transverse direction relative to the transducer housing;
   the motor(s) sub-assembly is configured to drive the transducer into transverse motion through the first transmission hardware set;
   the motor(s) sub-assembly is configured to drive the transducer housing into transverse motion through the second transmission hardware set; and
   the control module is structured, connected and/or programmed to control the motor(s) sub-assembly, the first transmission hardware set and/or the second transmission hardware set so that, during a seek operation: (i) a transverse position of the transducer is controlled to be aligned for transducer tracking during seek, and (ii) a transverse position of the transducer housing is controlled to even out wear across a transverse length of the transducer housing.

8. The assembly of claim 7 wherein the transducer includes two magnetic read/write head arrays and a separation shield.

9. The assembly of claim 7 wherein the motor(s) sub-assembly includes:
   a first motor operatively connected to the first transmission hardware set to drive the transducer into transverse direction motion through the first transmission hardware set; and a second motor operatively connected to the second transmission hardware set to drive the transducer into transverse direction motion through the first transmission hardware set.

10. The assembly of claim 9 wherein:
the first motor is a linear cam stack actuator;
the first transmission hardware set is a first spindle driven in linear direction motion by the first motor;
the transducer is rigidly mechanically connected to a distal end of the first spindle;
the second motor is a linear cam stack actuator;
the second transmission hardware set is a second spindle driven in linear direction motion by the second motor; and
the transducer housing is rigidly mechanically connected to a distal end of the first spindle.

11. The assembly of claim 9 wherein:
the first motor is a rotary motor;
the first transmission hardware set is a first threaded spindle driven in rotational direction motion by the first motor;
the transducer is threadably engaged with the first threaded spindle so that rotation of the first threaded spindle causes the transducer to move in the transverse direction;
the second motor is a rotary motor;
the second transmission hardware set is a second threaded spindle driven in rotational direction motion by the first motor; and
the transducer is threadably engaged with the second threaded spindle so that rotation of the second threaded spindle causes the transducer housing to move in the transverse direction.

12. The assembly of claim 9 wherein the second transmission hardware set is further operatively connected to the transducer to drive the transducer into transverse direction motion absent offsetting transverse direction motion caused by the first motor through the first transmission hardware set.

13. A tape drive system assembly comprising:
a transducer configured to read from and write to an elongated tape medium that defines a longitudinal direction and a transverse direction;
a transducer housing shaped to define a recess;
a motor(s) sub-assembly including at least one motor;
a first transmission hardware set;
a second transmission hardware set; and
a control module;
wherein:
the transducer is located in the recess in the transducer housing;
the recess and the transducer are sized and shaped so that the transducer can slide in the transverse direction relative to the transducer housing;
the motor(s) sub-assembly is configured to drive the transducer into transverse motion through the first transmission hardware set;
the motor(s) sub-assembly is configured to drive the transducer housing into transverse motion through the second transmission hardware set; and
the control module is structured, connected and/or programmed to control the motor(s) sub-assembly, the first transmission hardware set and/or the second transmission hardware set so that:
during a data access operation: (i) a transverse position of the transducer is controlled to be aligned with a predetermined data track on the tape medium, and (ii) a transverse position of the transducer housing is controlled to even out wear across a transverse length of the transducer housing, and
during a seek operation: (i) a transverse position of the transducer is controlled to be aligned for transducer tracking during seek, and (ii) a transverse position of the transducer housing is controlled to even out wear across a transverse length of the transducer housing.

14. The assembly of claim 13 wherein the transducer includes two magnetic read/write head arrays and a separation shield.

15. The assembly of claim 14 wherein the motor(s) sub-assembly includes:
a first motor operatively connected to the first transmission hardware set to drive the transducer into transverse direction motion through the first transmission hardware set; and
a second motor operatively connected to the second transmission hardware set to drive the transducer into transverse direction motion through the first transmission hardware set.

16. The assembly of claim 15 wherein:
the first motor is a linear cam stack actuator;
the first transmission hardware set is a first spindle driven in linear direction motion by the first motor;
the transducer is rigidly mechanically connected to a distal end of the first spindle;
the second motor is a linear cam stack actuator;
the second transmission hardware set is a second spindle driven in linear direction motion by the second motor; and
the transducer housing is rigidly mechanically connected to a distal end of the first spindle.

17. The assembly of claim 15 wherein:
the first motor is a rotary motor;
the first transmission hardware set is a first threaded spindle driven in rotational direction motion by the first motor;
the transducer is threadably engaged with the first threaded spindle so that rotation of the first threaded spindle causes the transducer to move in the transverse direction;
the second motor is a rotary motor;
the second transmission hardware set is a second threaded spindle driven in rotational direction motion by the first motor; and
the transducer is threadably engaged with the second threaded spindle so that rotation of the second threaded spindle causes the transducer housing to move in the transverse direction.

18. The assembly of claim 15 wherein the second transmission hardware set is further operatively connected to the transducer to drive the transducer into transverse direction motion absent offsetting transverse direction motion caused by the first motor through the first transmission hardware set.

19. The assembly of claim 13 wherein the control module is further structured, connected and/or programmed to control the motor(s) sub-assembly, the first transmission hardware set and/or the second transmission hardware set so that, during a data access operations and seek operations, the transducer housing moves in a sinusoidal pattern relative to the tape medium.

20. The assembly of claim 13 wherein the control module is further structured, connected and/or programmed to control seek and data access operations based upon SCSI (Small Computer System Interface) commands.

* * * * *